Sept. 28, 1926.
R. C. SCHREIBER
TRELLIS STAND AND HOLDER
Filed June 2, 1922
1,601,481
2 Sheets-Sheet 1
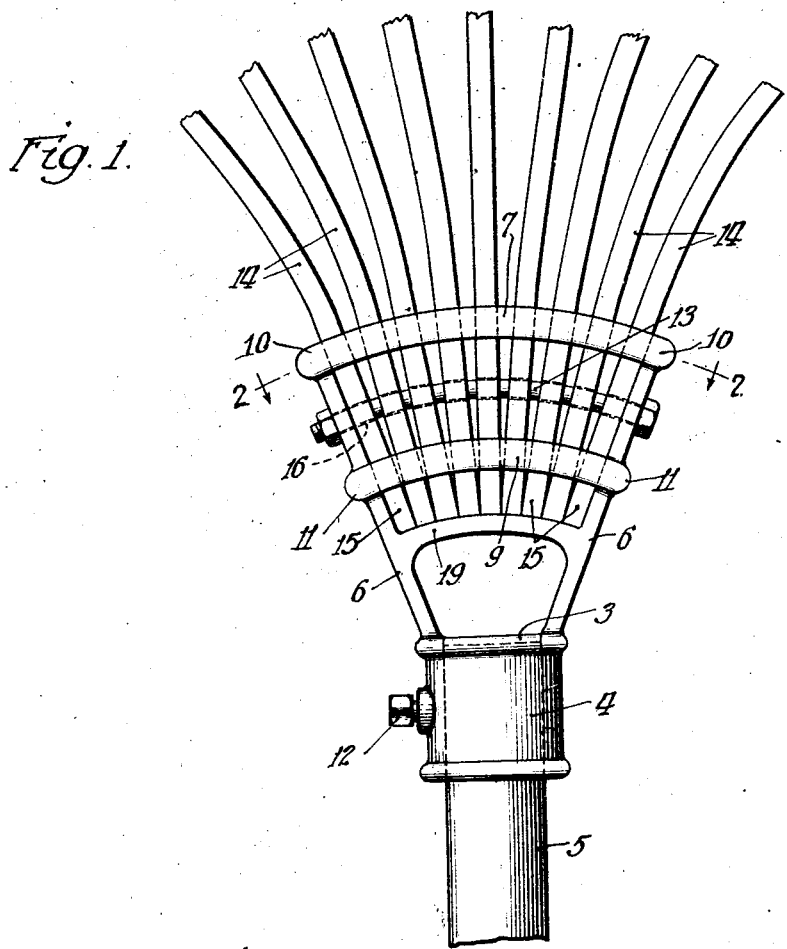
Fig. 1.
Fig. 2.
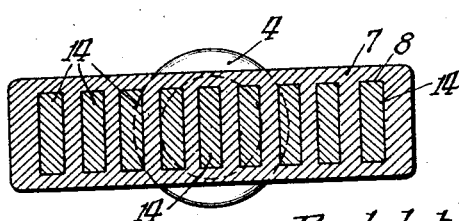
Inventor:
Rudolph C. Schreiber.
By Gabel & Mueller Attys.

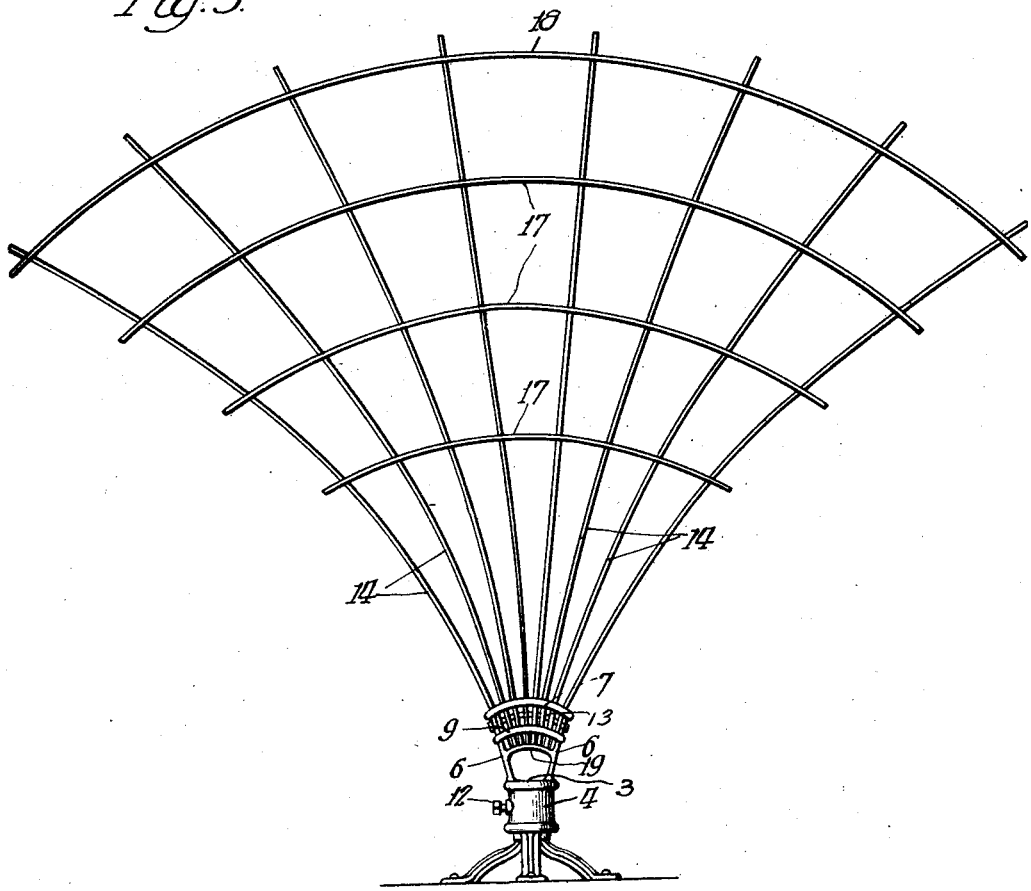

Patented Sept. 28, 1926.

1,601,481

UNITED STATES PATENT OFFICE.

RUDOLPH C. SCHREIBER, OF HARVEY, ILLINOIS.

TRELLIS STAND AND HOLDER.

Application filed June 2, 1922. Serial No. 565,336.

My invention relates to trellis stands, and more particularly to a stand which is adapted to be detachably mounted on a tubular or rod-like member.

It is a purpose of the invention to provide a device for supporting climbing vines or similar floral decorations, said device being adapted for either out door use or for use as a display stand in show windows. The device may be mounted on an iron post or a tripod, and is provided with a body portion which has a suitable socket member for receiving said post, said body portion being provided with openings for receiving a plurality of diverging wooden members forming the principal supporting portion of the trellis and being provided with means for securing said members to said body portion.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a face view of my improved trellis stand showing a portion of a trellis;

Fig. 2 is a section thereof taken on the line 2—2 of Fig. 1;

Fig. 3 is a front elevation of a trellis, showing my improved stand and tripod.

Referring in detail to the drawings, the trellis stand comprises a body portion or holder 3 preferably made of metal, said body portion being either a casting or being made in any other desired manner and being provided with a socket portion 4 which is adapted to receive a post 5 which may be a tubular or rod-like member of any cross section, but shown in the drawings as being circular, said socket having a set screw 12 for clamping the same in place. From the socket portion a pair of side members or arms 6 extend upwardly in diverging relation and are connected by means of the cross piece 7, said cross piece being provided with a plurality of openings 8. A web is provided at 9 connecting the members 6, said web comprising a pair of members which are spaced from each other for a purpose which will be explained below. The members 6 are slightly enlarged where the members 7 and 9 join the same as indicated at 10 and 11 respectively, and each of the members 6 is provided with an opening therethrough for receiving a curved bolt 13. The openings 8 are adapted to receive a plurality of slats, preferably of wood, indicated by the numeral 14. The slats 14, as will be evident from Fig. 3, spread toward the top of the device so as to form a fan-like trellis, and the lower ends 15 of said members extend between the spacing members 9 so as to hold the same in proper position near the lower ends thereof, said seats 15 resting on the transverse bar 19 which limits the downward movement thereof. Each of the members 14 is provided with an opening 16 through which the bolt 13 extends, said bolt serving to hold said members in the openings 8 and in assembled relation with the body portion 3. The slats 14 may be connected by transverse wooden strips 17 and 18, the strips 17 being placed intermediate the ends of the member 14 and the strip 18 being placed at the upper extremity of said slats to finish the same off.

From the above it will be seen that a very neat appearing yet simple and strong construction for a trellis is provided, which trellis may be conveniently mounted on a pipe or other post-like member for supporting the same in any desired place, the same being very convenient for use in a show window where the trellis would be frequently removed, or for use with plants that have a climbing tendency, which are placed in doors during the cold season and out doors during the warm season, due to the fact that the socket 4 can be readily removed from its supporting post because of the detachable connection provided between the post and the trellis at said socket.

Having thus described my invention, what I desire to claim and secure by U. S. Letters Patent is:

1. A device of the character described comprising a holder having a socket in one end thereof, a cross piece on said holder having a plurality of openings therein, a trellis comprising a plurality of slats extending through said openings and means for securing said slats to said holder, said means extending through the lower ends of said slats.

2. A device of the character described comprising a holder having a socket portion at one end thereof, diverging arms extending upwardly therefrom, a cross piece connecting said arms, said cross piece being provided with a plurality of openings therein, a trellis comprising a plurality of slats extending through said openings and means extending through said slats and said holder for securing said trellis to said holder.

In witness whereof, I hereunto subscribe my name this first day of May A. D., 1922.

RUDOLPH C. SCHREIBER.